(12) United States Patent
Hsiung

(10) Patent No.: US 8,542,482 B2
(45) Date of Patent: Sep. 24, 2013

(54) KEY ASSEMBLY AND ELECTRONIC DEVICE USING KEY ASSEMBLY

(75) Inventor: Ming-Chun Hsiung, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 255 days.

(21) Appl. No.: 12/904,237

(22) Filed: Oct. 14, 2010

(65) Prior Publication Data

US 2012/0050962 A1  Mar. 1, 2012

(30) Foreign Application Priority Data

Aug. 31, 2010 (CN) .......................... 2010 1 0268113

(51) Int. Cl.
*H05K 7/00* (2006.01)
*G06F 1/16* (2006.01)

(52) U.S. Cl.
USPC ............. 361/679.3; 361/679.13; 361/679.56; 361/679.01; 455/575.1; 200/341

(58) Field of Classification Search
USPC ................... 361/679.55, 679.56; 174/69, 50
See application file for complete search history.

(56) References Cited

U.S. PATENT DOCUMENTS

| | | | |
|---|---|---|---|
| 6,148,183 A * | 11/2000 | Higdon et al. ............. | 455/575.1 |
| 7,355,590 B2 * | 4/2008 | Jokinen et al. ................ | 345/169 |
| 7,697,281 B2 * | 4/2010 | Dabov et al. ............. | 361/679.55 |
| 7,729,114 B2 * | 6/2010 | Shi ............................. | 361/679.4 |
| 7,812,271 B2 * | 10/2010 | Lee et al. ...................... | 200/5 R |
| 7,990,695 B2 * | 8/2011 | Lv ................................ | 361/679.3 |
| 8,085,529 B2 * | 12/2011 | Zhang ...................... | 361/679.01 |
| 8,284,568 B2 * | 10/2012 | Xiao ............................ | 361/810 |
| 8,331,107 B2 * | 12/2012 | Ouyang ........................ | 361/807 |
| 8,344,278 B2 * | 1/2013 | Xiao ............................. | 200/339 |
| 8,396,521 B2 * | 3/2013 | Horimoto et al. .......... | 455/575.7 |
| 2004/0012916 A1 * | 1/2004 | Wolfson ....................... | 361/680 |
| 2004/0203518 A1 * | 10/2004 | Zheng et al. ................ | 455/90.3 |
| 2004/0240162 A1 * | 12/2004 | Hsu et al. ..................... | 361/680 |
| 2005/0272484 A1 * | 12/2005 | Griffin ....................... | 455/575.1 |
| 2011/0122569 A1 * | 5/2011 | Chang et al. ............. | 361/679.43 |

* cited by examiner

*Primary Examiner* — Adrian S Wilson
*Assistant Examiner* — Abhishek Rathod
(74) *Attorney, Agent, or Firm* — Altis Law Group, Inc.

(57) ABSTRACT

A key assembly includes a key member, the key member includes a main body and a securing portion extending from each end of the main body; and a pressing member for operating the key, the pressing member defines a receiving groove for receiving the main body.

3 Claims, 4 Drawing Sheets

KEY ASSEMBLY AND ELECTRONIC DEVICE USING KEY ASSEMBLY

BACKGROUND

1. Technical Field

This disclosure relates to keys and key assemblies using the keys, particularly to keys and key assemblies used in an electronic device.

2. Description of related art

Many electronic devices such as mobile phones, have housings with an interior compartment for receiving a printed circuit board (PCB) therein. The mobile phones usually include a side key assembly on an outer sidewall of the housing, so the user can operate the mobile phone with just one finger. However, many known side key assemblies have complicated configurations.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary key assembly and electronic device using the key. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
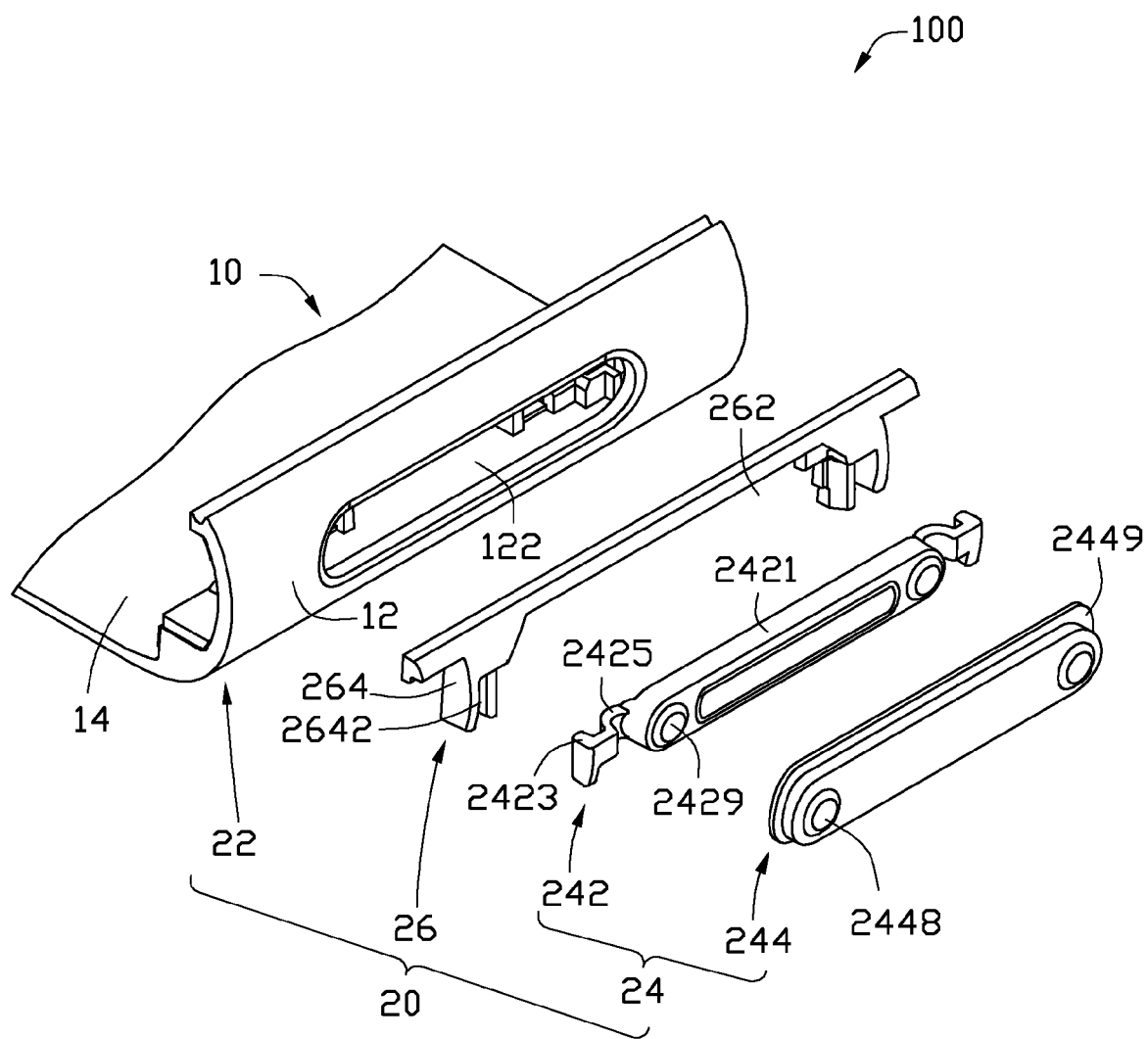
FIG. 1 is an exploded view of an electronic device using an exemplary key assembly.
Figure 2:
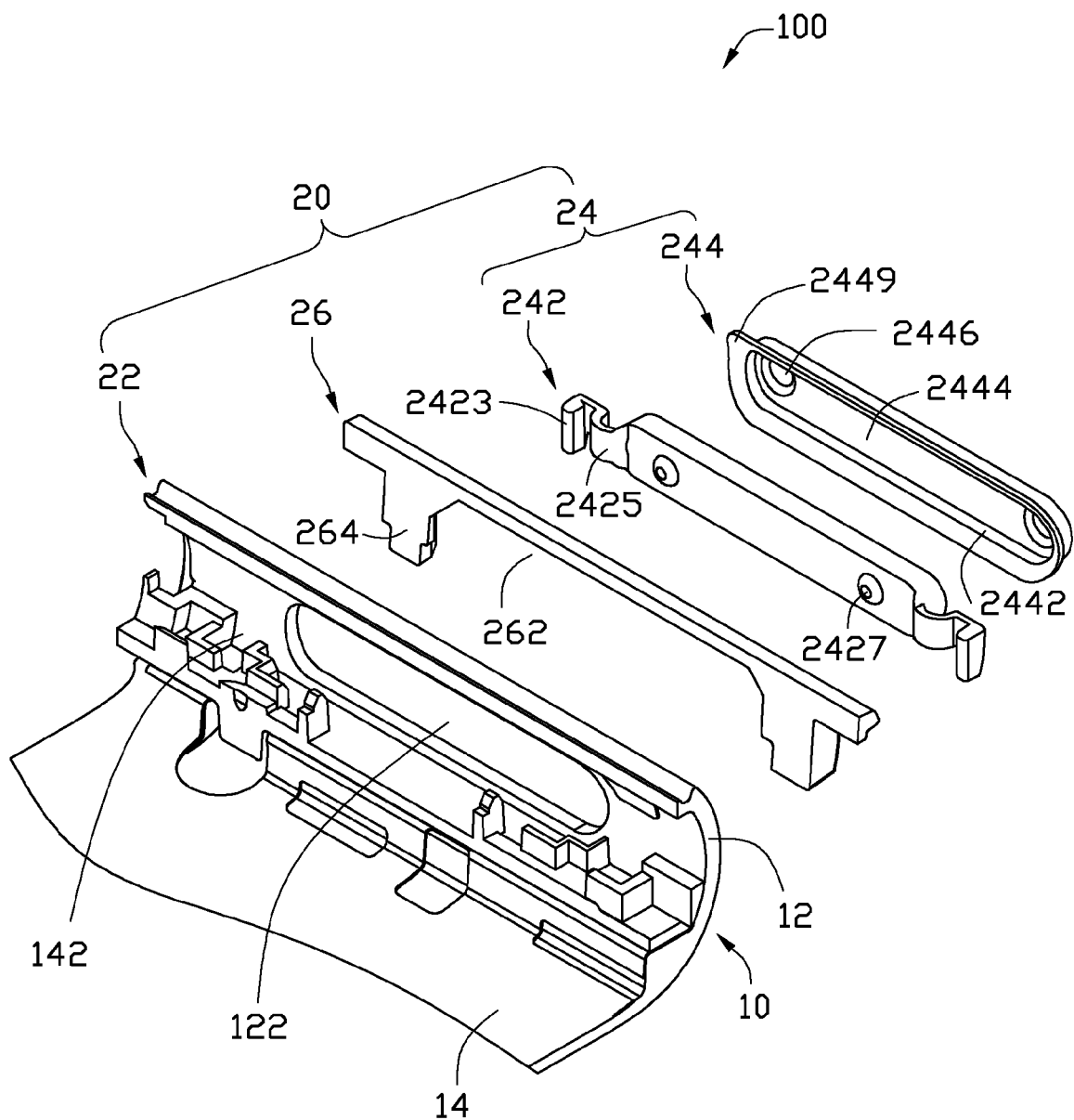
FIG. 2 is another exploded view of the electronic device shown in FIG. 1.

Referring to FIGS. 1 and 2, an exemplary electronic device 100, which may be a mobile phone in this case, includes a housing 10 and a key assembly 20 mounted on the housing 10. The housing 10 includes a sidewall 12 and a planar wall 14 connecting to the sidewall 12. The sidewall 12 defines a mounting hole 122 for mounting the key assembly 20. The planar wall 14 defines two retaining grooves 142 for holding the key assembly 20 on the housing 10.

The key assembly 20 includes a base 22, a key 24 and a retaining board 26. The base 22, in this exemplary embodiment, is a portion of the housing 10, and the mounting hole 122 and the retaining groove 142 are both located in the base 22. The key 24 includes a key member 242 and a pressing member 244 mounted on the key member 242. In this exemplary embodiment, the key member 242 may be made of resilient material such as rubber or plastic, the pressing member 244 may be made of metal such as iron.

The key member 242 includes a main body 2421 and two securing portions 2423 respectively located at opposite ends of the main body 2421. The key member 242 further includes two connecting arms 2425. Each connecting arm 2425 is located between one of the securing portions 2423 and the main body 2421 to retain a corresponding securing portion 2423 with the main body 2421. The securing portion 2423 is for securing the key member 242 to the retaining board 26.

The key member 242 further includes one or more actuators 2427 and a number of protrusions 2429 equal to the number of actuators 2427. If two actuators 2427 are used, they are respectively located on a same side of the main body 2421 that faces away from the pressing member 244 and each actuator 2427 is located at an opposite end of the main body 2421. The protrusions 2429 are located on a same side of the main body 2421 that faces the pressing member 244 and are at distal locations corresponding to the distal locations of the actuators 2427. The actuators 2427 can act as a switching mechanism that can actuate an electronic signal for the electronic device 100 when a protrusion 2429 is pressed.

The pressing member 244 defines a receiving groove 2442 on a side of the pressing member 244 opposing the key member 242, for receiving the main body 2421. In this exemplary embodiment, the main body 2421 may be adhered in the receiving groove 2442 to hold the pressing member 244 on the key member 242. The pressing member 244 further includes two slots 2446 recessed in a bottom 2444 of the receiving groove 2442, so two pressing portions 2448 are protruding on a side of the pressing member 244 faces away from the key member 242. When the pressing portion 2448 is pressed, a corresponding protrusion 2429 of the key member 242 pushes down the corresponding actuator 2427 to actuate an electronic signal for the electronic device 100 through electrical circuitry and switches (not shown). The pressing member 244 further includes a flange 2449 surrounding the receiving groove 2442. When the pressing member 244 is mounted on the base 22, the flange 2449 resists the base 22 to prevent the pressing member 244 and the base 22 from separating.

Figure 3:
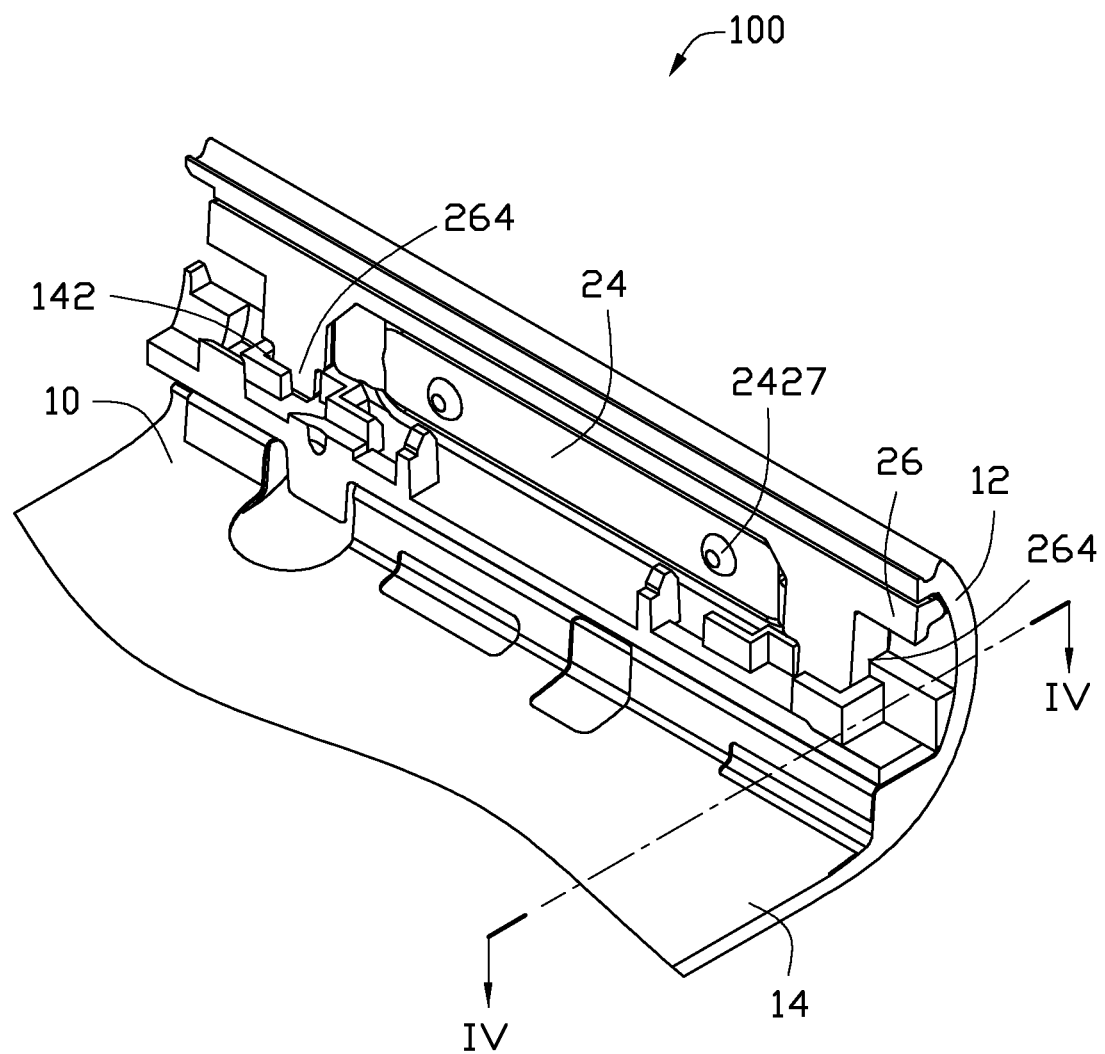
FIG. 3 is an assembled view of the electronic device shown in FIG. 2.
Figure 4:
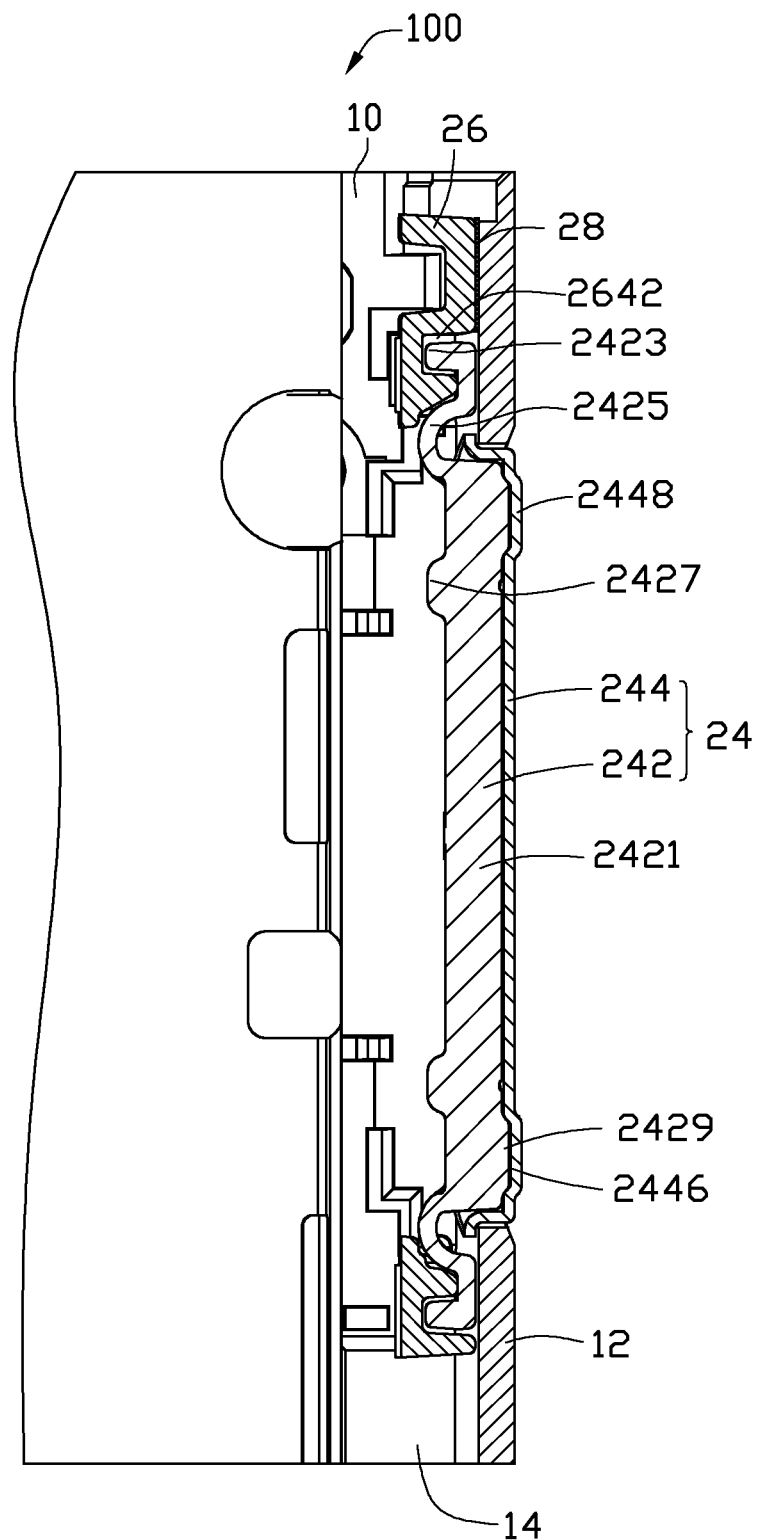
FIG. 4 is a cross-sectional view of the electronic device shown in FIG. 3 along the line IV-IV.

Referring to FIGS. 4 and 3, in assembly, the main body 2421 is retained (e.g., adhered) in the receiving groove 2442 with the protrusions 2429 accommodating in the slots 2446 so the pressing member 244 is mounted to the key member 242 to yield an assembled key 24. The pressing member 244 is accommodated in the mounting hole 122 with the flange 2449 resisting the base 22. The holding portions 264 are retained in the retaining grooves 142 to hold the retaining board 26 on the base 22. Simultaneously, the securing portions 2423 are secured in the securing groove 2642 to mount the key member 242 on the retaining board 26 so the flange 2449 is held between the base 22 and the retaining board 26 to hold the key 24 on the base 22.

The retaining board 26 defines a notch 262. When the retaining board 26 is mounted to the key member 242, the notch 262 is aligned with the main body 2421 of the key member 242 to allow the main body 2421 to pass through the retaining board 26. The retaining board 26 further includes a holding portion 264 respectively located at each end thereof. Each holding portion 264 is retained in one of the retaining grooves 142 to hold the retaining board 26 to the base 22. Each holding portion 264 defines a securing groove 2642 for securing one of the securing portions 2423 to mount the key member 242 to the retaining board 26.

Referring to FIGS. 4 and 5, in assembly, the main body 2421 is retained (e.g., adhered) in the receiving groove 2242 with the protrusions 2429 accommodating in the slots 2446 so the pressing member 244 is mounted to the key member 242 to yield an assembled key 24. The pressing member 244 is accommodated in the mounting hole 122 with the flange 2449 resisting the base 22. The holding portions 264 are retained in the retaining grooves 142 to hold the retaining board 26 on the base 22. Simultaneously, the securing portions 2423 are secured in the securing groove 2642 to mount the key member 242 on the retaining board 26 so the flange 2449 is held between the base 22 and the retaining board 26 to hold the key 24 on the base 22.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A key assembly, comprising:
   a key member including a main body and a securing portion extending from each end of the main body, the key member further comprising two arcuate connecting arms, and each connecting arm located between one of the securing portions and the main body to retain the securing portions to the main body, the securing portion being an L-shaped plate;
   a retaining board defining a notch and forming two opposite holding portions, the notch being defined between the two opposite holding portions, and the two opposite holding portions being coplanar; and
   a pressing member for operating the key member, the pressing member defining a receiving groove for receiving the main body;
   wherein each holding portion defines a securing groove corresponding to the securing portion, the securing groove extends along the holding portion; the notch is aligned with the main body and each securing portion is received in the corresponding securing groove.

2. A key assembly, comprising:
   a base defining a mounting hole therein; and
   a key mounted in the mounting hole, the key comprising:
   a key member including a main body and a securing portion extending from each end of the main body, the key member further comprising two arcuate connecting arms, and each connecting arm located between one of the securing portions and the main body to retain the securing portions to the main body, the securing portion being an L-shaped plate;
   a retaining board secured to the base, the retaining board defining a notch and forming two opposite holding portions, the notch being defined between the two opposite holding portions, and the two opposite holding portions being coplanar; and
   a pressing member for operating the key, the pressing member defining a receiving groove for receiving the main body;
   wherein each holding portion defines a securing groove corresponding to the securing portion, the securing groove extends along the holding portion; the notch is aligned with the main body and each securing portion is received in the corresponding securing groove.

3. An electronic device, comprising:
   a housing defining a mounting hole therein; and
   a key mounted in the mounting hole, the key comprising:
   a key member including a main body and a securing portion extending from each end of the main body, the key member further comprising two arcuate connecting arms, and each connecting arm located between one of the securing portions and the main body to retain the securing portions to the main body, the securing portion being an L-shaped plate;
   a retaining board secured to the housing, the retaining board defining a notch and forming two opposite holding portions, the notch being defined between the two opposite holding portions, and the two opposite holding portions being coplanar; and
   a pressing member for operating the key, the pressing member defining a receiving groove for receiving the main body;
   wherein each holding portion defines a securing groove corresponding to the securing portion, the securing groove extends along the holding portion; the notch is aligned with the main body and each securing portion is received in the corresponding securing groove.

* * * * *